United States Patent
Thompson et al.

(10) Patent No.: US 11,601,754 B2
(45) Date of Patent: Mar. 7, 2023

(54) METHOD OF PROVIDING AUDIO IN AN AUTOMOBILE, AND AN AUDIO APPARATUS FOR AN AUTOMOBILE

(71) Applicant: Tymphany Worldwide Enterprises Limited, Grand Cayman (KY)

(72) Inventors: James Meredith Thompson, Grand Cayman (KY); Thilo Christian Stompler, Grand Cayman (KY); Gavin Jones, Grand Cayman (KY); John Evan Bunner, Grand Cayman (KY)

(73) Assignee: Tymphany Worldwide Enterprises Limited, Grand Cayman (KY)

( * ) Notice: Subject to any disclaimer, the term of this patent is extended or adjusted under 35 U.S.C. 154(b) by 0 days.

(21) Appl. No.: 17/470,877

(22) Filed: Sep. 9, 2021

(65) Prior Publication Data
US 2022/0078554 A1 Mar. 10, 2022

Related U.S. Application Data

(60) Provisional application No. 63/076,132, filed on Sep. 9, 2020.

(51) Int. Cl.
*H04R 5/02* (2006.01)
*B60R 11/02* (2006.01)
(Continued)

(52) U.S. Cl.
CPC ............ *H04R 5/02* (2013.01); *B60R 11/0217* (2013.01); *H04R 1/403* (2013.01); *H04R 3/12* (2013.01);
(Continued)

(58) Field of Classification Search
CPC . H04R 5/02; H04R 1/403; H04R 3/12; H04R 5/04; H04R 2499/13; H04S 1/002; H04S 2400/01; B60R 11/0217
See application file for complete search history.

(56) References Cited

U.S. PATENT DOCUMENTS

2008/0273712 A1* 11/2008 Eichfeld ................. H04S 7/302
381/86
2008/0273723 A1* 11/2008 Hartung ................. H04R 1/403
381/302
(Continued)

*Primary Examiner* — Jason R Kurr
(74) *Attorney, Agent, or Firm* — Finnegan, Henderson, Farabow, Garrett & Dunner, LLP

(57) ABSTRACT

An audio system for a vehicle may include: an audio signal processing system arranged to process a plurality of audio channels and generate a principal signal and an accommodating signal for each of the plurality of audio channels; an array of loudspeakers including at least two pairs of loudspeakers, each of the at least two pairs of loudspeakers including a front loudspeaker and a rear loudspeaker; wherein the loudspeakers of the array are positioned such that a first line connecting acoustic centers of a front loudspeaker and a rear loudspeaker of a first pair of loudspeakers is angularly displaced relative to a second line connecting acoustic centers of a front loudspeaker and a rear loudspeaker of a second pair of loudspeakers; and wherein the audio signal processing system is arranged to provide a principal signal of a first audio channel among the plurality of audio channels to the front loudspeaker of the first pair of loudspeakers, provide an accommodating signal of the first audio channel to the rear loudspeaker of the first pair of loudspeakers, provide a principal signal of a second audio channel among the plurality of audio channels to the front loudspeaker of the second pair of loudspeakers, and provide an accommodating signal of the second audio channel to the rear loudspeaker of the second pair of loudspeakers, to generate a directional radiation pattern from the array of loudspeakers, wherein the directional radiation pattern includes a forward component and a rearward component associated with the first pair of loudspeakers and a forward component and a rearward component associated with the second pair of loudspeakers, and wherein the forward component associated with the first pair of loudspeakers and the (Continued)

forward component associated with the second pair of loudspeakers are directed toward at least one reflecting surface of the vehicle.

23 Claims, 13 Drawing Sheets

(51) Int. Cl.
    *H04R 1/40*     (2006.01)
    *H04R 3/12*     (2006.01)
    *H04R 5/04*     (2006.01)
    *H04S 1/00*     (2006.01)

(52) U.S. Cl.
    CPC ............... *H04R 5/04* (2013.01); *H04S 1/002* (2013.01); *H04R 2499/13* (2013.01); *H04S 2400/01* (2013.01)

(56) References Cited

U.S. PATENT DOCUMENTS

| | | | | |
|---|---|---|---|---|
| 2012/0263306 A1* | 10/2012 | McGowan | ............... | H04R 5/00 |
| | | | | 381/17 |
| 2013/0142353 A1* | 6/2013 | Silzle | ..................... | H04R 1/323 |
| | | | | 381/86 |
| 2020/0169808 A1* | 5/2020 | Willems | ................... | H04R 7/12 |
| 2020/0374631 A1* | 11/2020 | Hayashi | ................ | H04R 1/025 |

\* cited by examiner

METHOD OF PROVIDING AUDIO IN AN AUTOMOBILE, AND AN AUDIO APPARATUS FOR AN AUTOMOBILE

The present application claims the benefit of priority to U.S. Provisional Application No. 63/076,132 filed on Sep. 9, 2020, the contents of which are incorporated herein by reference.

TECHNICAL FIELD

The disclosed embodiments relate to methods and apparatus for providing audio in a vehicle. The disclosed embodiments further include a vehicle comprising an audio apparatus.

BACKGROUND

Many audio systems for vehicles are designed to provide an immersive audio experience to occupants of the vehicle. Early vehicle audio systems had just a single speaker and then stereo systems were introduced with two speakers, typically one mounted to each front door. More recently it has become common for vehicles to have a plurality of speakers, and perhaps one or more sub-woofers distributed throughout the vehicle in order to provide a more immersive experience, and to provide multi-channel audio. While the immersive qualities of audio systems for vehicles has improved, opportunities remain for further enhancing the immersive qualities of vehicle audio systems and simplifying manufacturability and installation of these systems. The disclosed embodiments are directed to improvements in one or more of these (or other) areas.

SUMMARY

The presently disclosed embodiments include an audio system for a vehicle. The audio system may include: an audio signal processing system arranged to process a plurality of audio channels and generate a principal signal and an accommodating signal for each of the plurality of audio channels; an array of loudspeakers including at least two pairs of loudspeakers, each of the at least two pairs of loudspeakers including a front loudspeaker and a rear loudspeaker; wherein the loudspeakers of the array are positioned such that a first line connecting acoustic centers of a front loudspeaker and a rear loudspeaker of a first pair of loudspeakers is angularly displaced relative to a second line connecting acoustic centers of a front loudspeaker and a rear loudspeaker of a second pair of loudspeakers; and wherein the audio signal processing system is arranged to provide a principal signal of a first audio channel among the plurality of audio channels to the front loudspeaker of the first pair of loudspeakers, provide an accommodating signal of the first audio channel to the rear loudspeaker of the first pair of loudspeakers, provide a principal signal of a second audio channel among the plurality of audio channels to the front loudspeaker of the second pair of loudspeakers, and provide an accommodating signal of the second audio channel to the rear loudspeaker of the second pair of loudspeakers, to generate a directional radiation pattern from the array of loudspeakers, wherein the directional radiation pattern includes a forward component and a rearward component associated with the first pair of loudspeakers and a forward component and a rearward component associated with the second pair of loudspeakers, and wherein the forward component associated with the first pair of loudspeakers and the forward component associated with the second pair of loudspeakers are directed toward at least one reflecting surface of the vehicle.

The disclosed embodiments also include a vehicle including the disclosed audio system.

DETAILED DESCRIPTION

Figure 1:
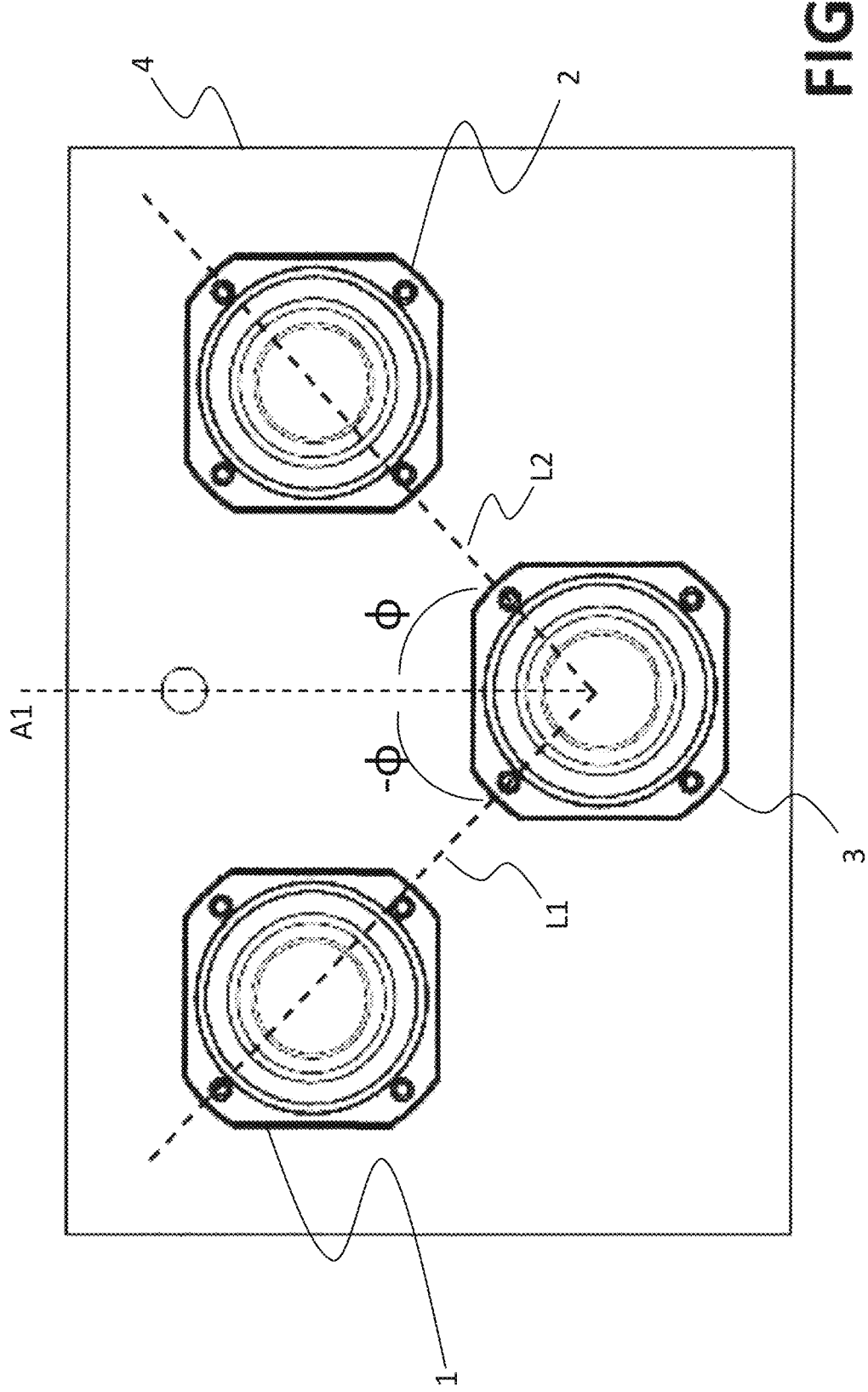
FIG. 1 shows a speaker array having three speakers.
Figure 2:
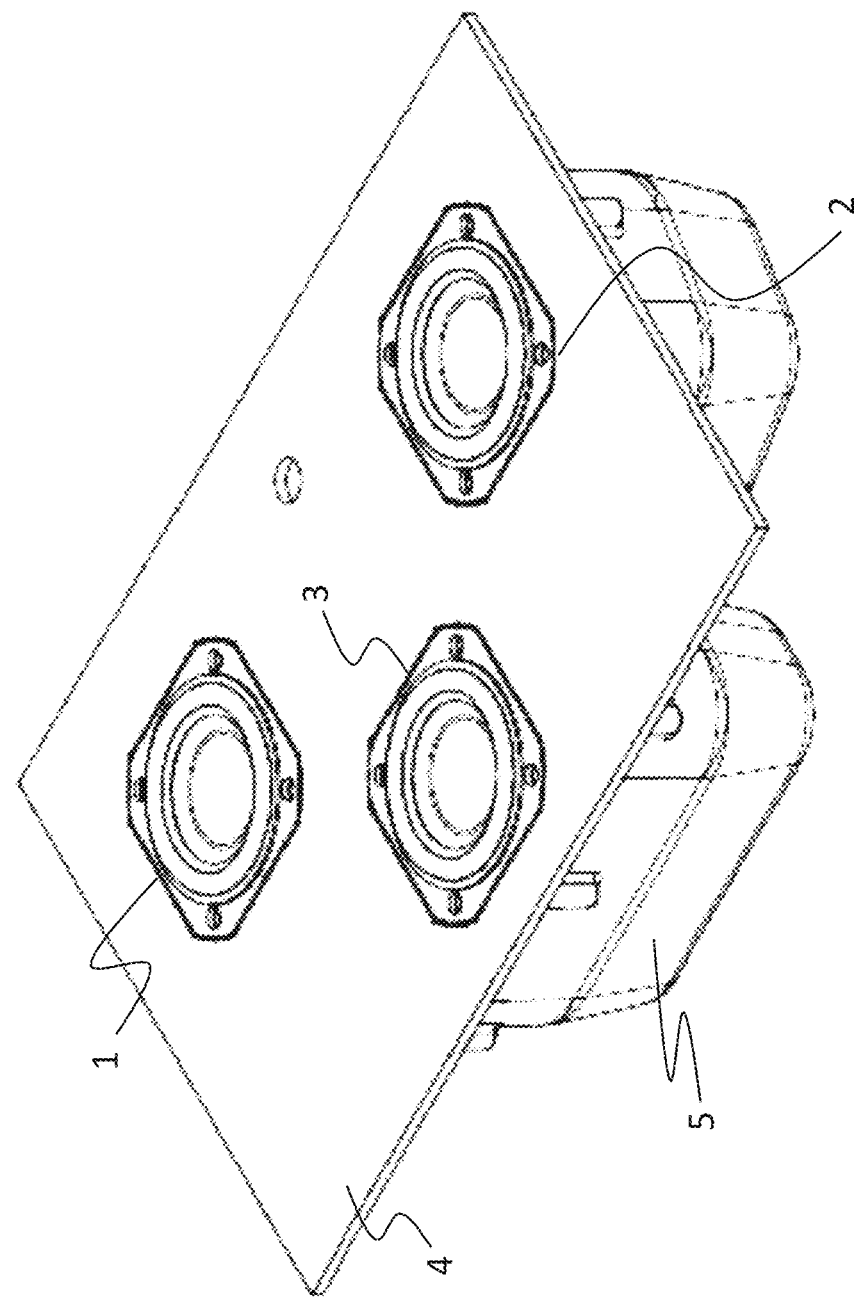
FIG. 2 shows another view of the speaker array of FIG. 1.

FIG. 1 shows an exemplary loudspeaker array comprising three loudspeakers 1, 2 and 3 mounted in a baffle 4. FIG. 2 provides a perspective view of the speaker array shown in FIG. 1. In this embodiment, speakers 1 and 2 may be referred to as front speakers, and speaker 3 may be referred to as a rear speaker. The speaker array of FIG. 1 can be divided into two pairs of loudspeakers such that each of the two pairs of loudspeakers includes a front loudspeaker and a rear loudspeaker. Specifically, in this embodiment, speakers 1 and 3 provide a first pair of speakers, where speaker 1 is the front speaker, and speaker 3 is the rear speaker of the first pair of speakers. Similarly, speakers 2 and 3 provide a second pair of speakers, where speaker 2 is the front speaker, and speaker 3 is the rear speaker of the second pair of speakers. In this embodiment, speaker 3 serves both as the rear loudspeaker of the first pair of loudspeakers and as the rear loudspeaker of the second pair of loudspeakers.

The speakers can be mounted in any suitable configuration within the array. For example, as shown in FIGS. 1 and 2, a rear speaker of the array may be offset (e.g., a horizontal offset) from front speakers of the array. In this embodiment, rear speaker 3 is offset from front speakers 1 and 2 such that a first line L1 connecting acoustic centers of front loudspeaker 1 and rear loudspeaker 3 is angularly displaced relative to a second line L2 connecting acoustic centers of front loudspeaker 2 and a rear loudspeaker 3.

The angular displacement between lines L1 and L2 may be represented by angles $\phi$ and $-\phi$, as shown in FIG. 1, where these angles are referenced relative to a forward axis A1 associated with the speaker array. Various amounts of lateral offset between the rear speaker and the front speakers may be used to provide various angular displacements between line L1 and axis A1 and between axis A1 and line L2 (e.g., such that lines L1 and L2 are non-parallel). In some cases, angle ϕ may be between 45° and 50° (e.g., 47°). In such cases, the angular displacement between lines L1 and L2 (i.e., 2ϕ) is between 90° and 100°. In other cases, angle ϕ may be between 30° and 70°. In such cases, the angular displacement between lines L1 and L2 (i.e., 2ϕ) is between 60° and 140°. Other relative offsets providing other angular displacements may also be used depending on the requirements of a particular application.

FIG. 2 provides a perspective view of the speaker array of FIG. 1. Speakers 1, 2, and 3 are mounted on baffle 4, and the housings 5 of each speaker extend below the plane of the baffle 4.

Figure 3:
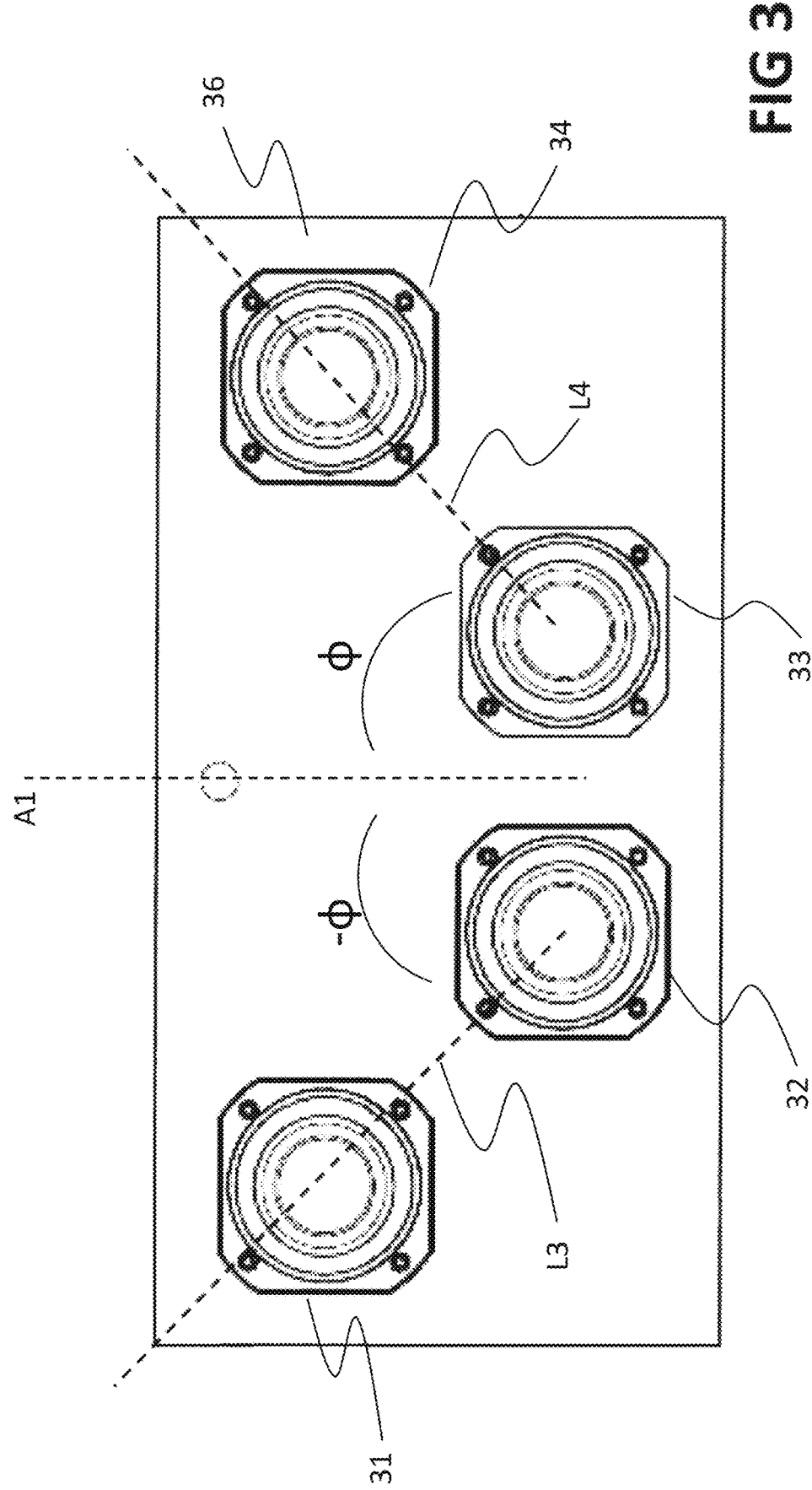
FIG. 3 shows a speaker array having four speakers.

FIG. 3 shows another exemplary embodiment in which the audio system includes four loudspeakers 31, 32, 33, 34 mounted on a baffle 36. In this embodiment, speakers 31 and 34 may be referred to as front speakers, and speakers 32 and 33 may be referred to as rear speakers. The speaker array of FIG. 3 can be divided into two pairs of loudspeakers such that each of the two pairs of loudspeakers includes a front loudspeaker and a rear loudspeaker. Specifically, in this embodiment, speakers 31 and 32 provide a first pair of speakers, where speaker 31 is the front speaker, and speaker 32 is the rear speaker of the first pair of speakers. Similarly, speakers 34 and 33 provide a second pair of speakers, where speaker 34 is the front speaker, and speaker 33 is the rear speaker of the second pair of speakers. In contrast to the example of FIG. 1, in this embodiment, pairs of speakers do not share a rear loudspeaker.

The speakers included in the example of FIG. 3 can be mounted in any suitable configuration within the array. For example, as shown in FIG. 3, rear speakers 32 and 33 of the array may be offset (e.g., a horizontal offset) from front speakers 31 and 34 of the array. In this embodiment, rear speakers 32 and 33 are offset from front speakers 31 and 34 such that a first line L3 connecting acoustic centers of front loudspeaker 31 and rear loudspeaker 32 is angularly displaced relative to a second line L4 connecting acoustic centers of front loudspeaker 34 and a rear loudspeaker 33.

The angular displacement between lines L3 and L4 may be represented by angles ϕ and −ϕ, as shown in FIG. 3, where these angles are referenced relative to a forward axis A1 associated with the speaker array. Various amounts of lateral offset between the rear speakers and the front speakers may be used to provide various angular displacements between line L3 and axis A1 and between axis A1 and line L4 (e.g., such that lines L3 and L4 are non-parallel). In some cases, angle ϕ may be between 45° and 50° (e.g., 47°). In such cases, the angular displacement between lines L3 and L4 (i.e., 2ϕ) is between 90° and 100°. In other cases, angle ϕ may be between 30° and 70°. In such cases, the angular displacement between lines L3 and L4 (i.e., 2ϕ) is between 60° and 140°. Other relative offsets providing other angular displacements may also be used depending on the requirements of a particular application.

Additionally, the speakers in the arrays of the examples shown in any of FIG. 1, 2, or 3 may exhibit other relational characteristics. For example, in the example embodiments of FIGS. 1-3, loudspeakers 1, 2, 3, 31, 32, 33, and 34 are positioned in the audio system such that their acoustic centers are substantially co-planar. That is, all of the loudspeakers are mounted on a common, planar baffle 4, 36 such that there is little to no vertical offset among the loudspeakers. Further, the loudspeakers may be positioned in the audio system such that longitudinal axes of the loudspeakers extending through the acoustic centers of the loudspeakers (e.g., in a direction out of the page in FIG. 1 and in FIG. 3) are substantially parallel.

Other relative orientations between the loudspeakers, however, may also be employed. For example, in some cases, a vertical offset may be included between any pair of speakers included in the disclosed speaker arrays. Additionally or alternatively, any speaker in the disclosed arrays may be rotated relative to baffle 4, 36 such that longitudinal axes of two or more speakers included in an array are non-parallel.

The audio systems of FIGS. 1-3 may be mounted in a vehicle in any suitable orientation. In some cases, the audio system may be mounted such that the baffle 4, 36 resides on a substantially horizontal plane. In this configuration, loudspeakers 1, 2, and 3 of the example embodiment of FIGS. 1 and 2 or loudspeakers 31, 32, 33, and 34 of the FIG. 3 embodiment will be in an upfiring orientation. In other cases, however, the audio system may be installed in a vehicle such that baffle 4, 36 resides parallel to any non-horizontal plane. The audio system, for example, may be mounted in a dashboard of a vehicle, in an instrument panel of a vehicle, or relative to any other surface included within a passenger compartment of a vehicle.

Any of the speakers described herein (e.g., speakers 1, 2, 3, 31, 32, 33, 34, and/or any other described speakers) may constitute individual drivers (e.g., tweeters, mid-range, etc.) of a speaker system. Such speakers may include 30 mm to 80 mm drivers (e.g., 50 mm drivers).

Figure 4:
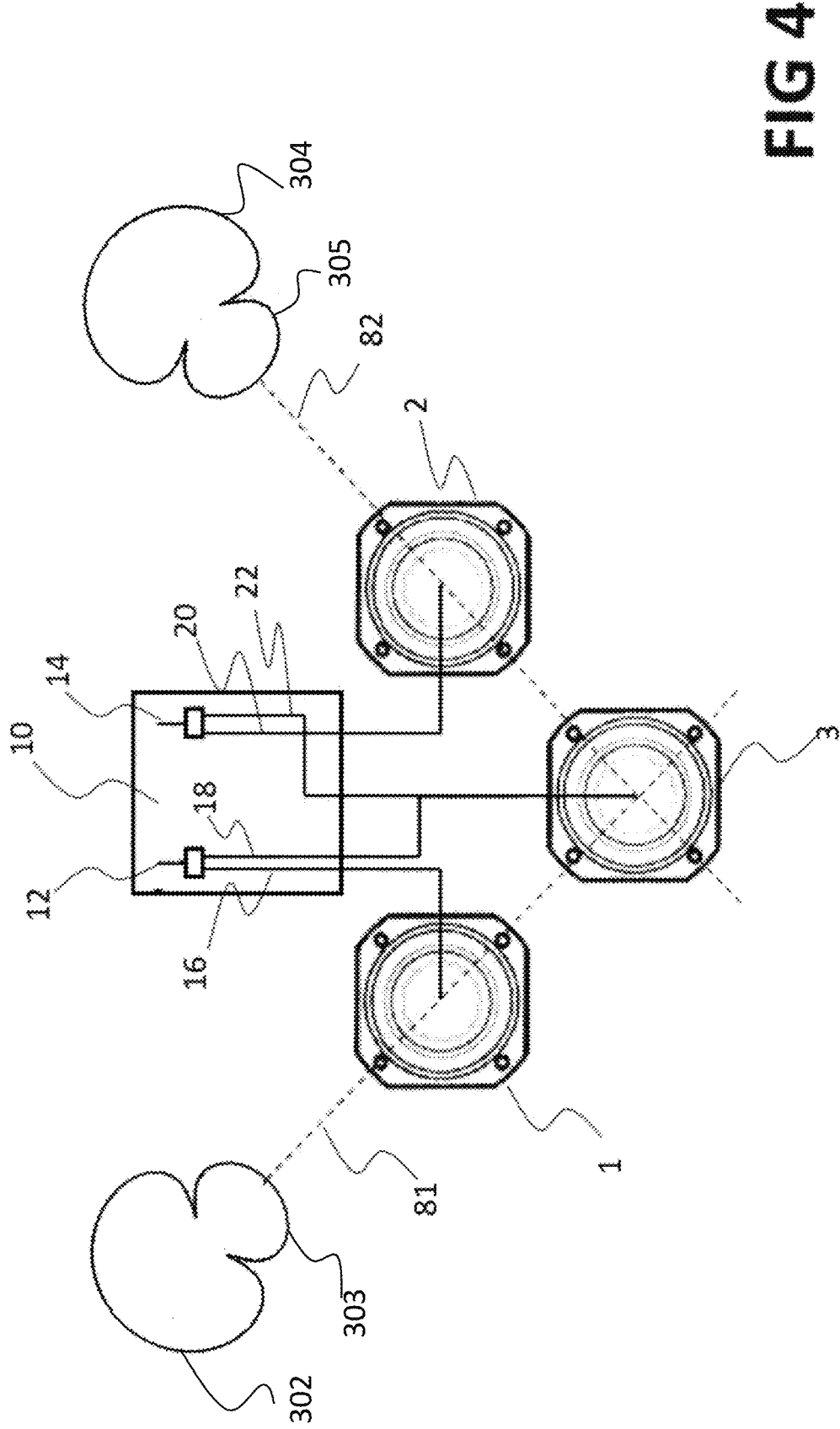
FIG. 4 shows a three-speaker arrangement and connections to an audio signal processing system.

FIG. 4 shows a three-speaker arrangement used in disclosed audio systems for reproducing stereo signals. For example, an audio signal processing system 10, which may for example be implemented by one or more digital signal processors, provides (or is provided with) a first audio channel 12 and a second audio channel 14, which may comprise left and right channels of a stereo signal.

The first audio channel 12 may be used to provide a first principal signal 16, which may correspond to the signal of the first audio channel 12 (e.g., not processed by inverting, phase shifting, filtering, etc.). Additionally, based on the first audio channel 12, a first accommodating signal 18 may be generated. Accommodating signal 18 may constitute a processed version of the signal supplied as first audio channel 12 and/or a processed version of principal signal 16.

The second audio channel 14 may be used to provide a second principal signal 20, which may correspond to the signal of the second audio channel 14 (e.g., not processed by inverting, phase shifting, filtering, etc.). Additionally, based on the second audio channel 14, a second accommodating signal 22 may be generated. Accommodating signal 22 may constitute a processed version of the signal supplied as second audio channel 14 and/or a processed version of the second principal signal 20.

Figure 5:
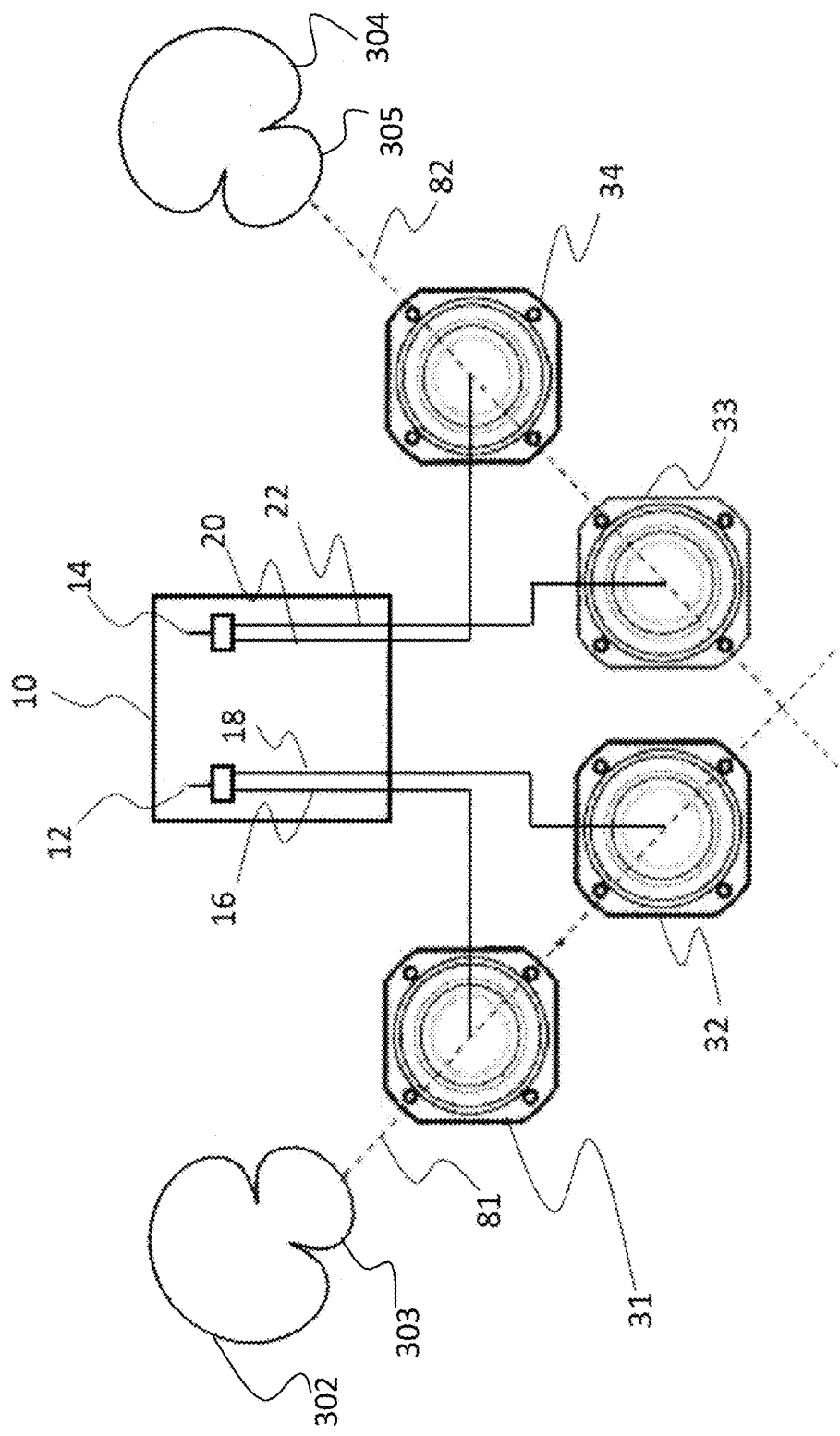
FIG. 5 shows a four-speaker arrangement and connections to an audio signal processing system.

FIG. 5 shows a four-speaker arrangement used in disclosed audio systems for reproducing stereo signals. For example, an audio signal processing system 10, which may for example be implemented by one or more digital signal processors, provides (or is provided with) a first audio channel 12 and a second audio channel 14, which may comprise left and right channels of a stereo signal.

The first audio channel 12 may be used to provide a first principal signal 16, which may correspond to an unprocessed version of the signal of the first audio channel 12. Additionally, based on the first audio channel 12, a first accommodating signal 18 may be generated. Accommodating signal 18 may constitute a processed version of the signal supplied as first audio channel 12 and/or a processed version of principal signal 16.

The second audio channel 14 may be used to provide a second principal signal 20, which may correspond to an unprocessed version of the signal of the second audio channel 14. Additionally, based on the second audio channel 14, a second accommodating signal 22 may be generated. Accommodating signal 22 may constitute a processed version of the signal supplied as second audio channel 14 and/or a processed version of the second principal signal 20.

Various types of processing may be used to generate accommodating signals 18, 22 in the embodiments of FIGS. 4 and 5. In some cases, audio signal processing system 10 may include a signal inverter for use in generating accommodating signals 18 and/or 22. Additionally or alternatively, a delay or phase shift may be imparted, e.g., to principal signal 16 or to principal signal 20 to generate accommodating signal 18 or accommodating signal 22. Various delays may be applied to generate the accommodating signals 18 and/or 22. For example, in some embodiments, accommodating signals 18, 22 may be delayed by between 0.05 and 0.5 milliseconds relative to principal signals 16, 20. Additionally, one or more filters may be applied to principal signals 16 and/or 20 to provide accommodating signals 18 and/or 22. Such filtering may include low pass filtering, high pass filtering, band pass filtering, etc. In addition to inversion, delays, and filtering, the accommodating signals may also be mixed, summed, level adjusted, etc. by the DSP or in other processing circuitry.

The described accommodating signals may be generated by applying a delay to the respective principal signals, wherein the delay may be varied in order to alter the null (e.g., the polar location) of a directional radiation pattern. By controlling the null, the effects of the audio, such as stereo audio reflected in different directions from the loudspeaker pairs, can be altered and tailored to match particular vehicle configurations and particular occupant locations within a vehicle.

As shown in FIG. 4, the principal signals 16 and 20 are supplied, respectively, to the front speakers 1 and 2. In this embodiment, in which the rear speaker 3 is shared between two pairs of loudspeakers (i.e., speaker 1/speaker 3 and speaker 2/speaker 3), the accommodating signals 18 and 22 are both provided to the shared rear speaker 3. Rear speaker 3 can simultaneously reproduce sound associated with accommodating signals 18 and 22.

In the four-speaker embodiment of FIG. 5, the principal signals 16 and 20 are supplied, respectively, to the front speakers 31 and 34. The accommodating signals 18 and 22 are supplied, respectively, to the rear speakers 32 and 33.

Providing the principal signals to the front speakers of an array of speakers and providing the accommodating signals to the rear speakers of the array can result in the generation of a directional sound radiation pattern from the array of loudspeakers. For example, as shown in FIG. 4, the directional radiation pattern of the speaker array includes a forward component 302 and a rearward component 303 associated with the first pair of loudspeakers 1 and 3. The directional radiation pattern of the speaker array also includes a forward component 304 and a rearward component 305 associated with the second pair of loudspeakers 2 and 3. Similarly, in the embodiment of FIG. 5, the directional radiation pattern of the speaker array includes a forward component 302 and a rearward component 303 associated with the first pair of loudspeakers 31 and 32. The directional radiation pattern of the speaker array in FIG. 5 also includes a forward component 304 and a rearward component 305 associated with the second pair of loudspeakers 34 and 33. The forward and rearward components may be projected in opposite directions along lines 81 and 82, as shown in FIGS. 4 and 5. Lines 81 and 82 may lie in planes coincident with baffle 4, as shown in FIGS. 1-3.

In some cases, forward components 302 and 304 may be directed to one or more reflecting surfaces (e.g., within a vehicle). Rearward components 303 and 305 may project toward occupant locations in a vehicle, but by controlling the accommodating signals generated from respective principal signals (as discussed in further detail below), a sound intensity associate with rearward components 303 and 305 may be less (e.g., significantly less) than a sound intensity associated with forward components 302 and 304. As a result, listeners may perceive forward components 302 and 304 as the more dominant sound signals. And, as the forward components 302 and 304 may be directed to occupant locations in a vehicle via one or more reflecting surfaces (e.g., windscreen, headliner, side windows, rear window, doors, etc.), listeners may perceive sounds associated with forward components 302 and 304 as originating from various locations within the vehicle, contributing to an immersive listening experience. It should be noted that one or more waveguides may also be used to further control the directionality of sound generated by the disclosed speaker arrays. As shown in FIGS. 4 and 5, forward component 302 is projected in a direction (along line 81) that is different from a direction along line 82 in which forward component 304 is projected.

The directional radiation patterns of the speaker arrays shown in FIGS. 4 and 5 may exhibit a shape (e.g., a cardioid shape), which produces more energy/sound pressure in the forward direction (e.g., associated with forward components 302 and 304) than in the rearward direction (e.g., associated with rearward components 303 and 305). In effect, therefore, directional sound is output in directions L1, L2, L3, and L4, as shown in FIGS. 1 and 3. Because a directional radiation pattern may be generated from an array of speakers, as shown in FIGS. 4 and 5, a directional output is obtained. By positioning the speaker arrays such that these directional patterns are reflected from surfaces in a vehicle, the reflected signals can be used to provide multichannel (e.g., stereo or other multichannel) audio to occupants in various locations within a vehicle.

Figure 6:
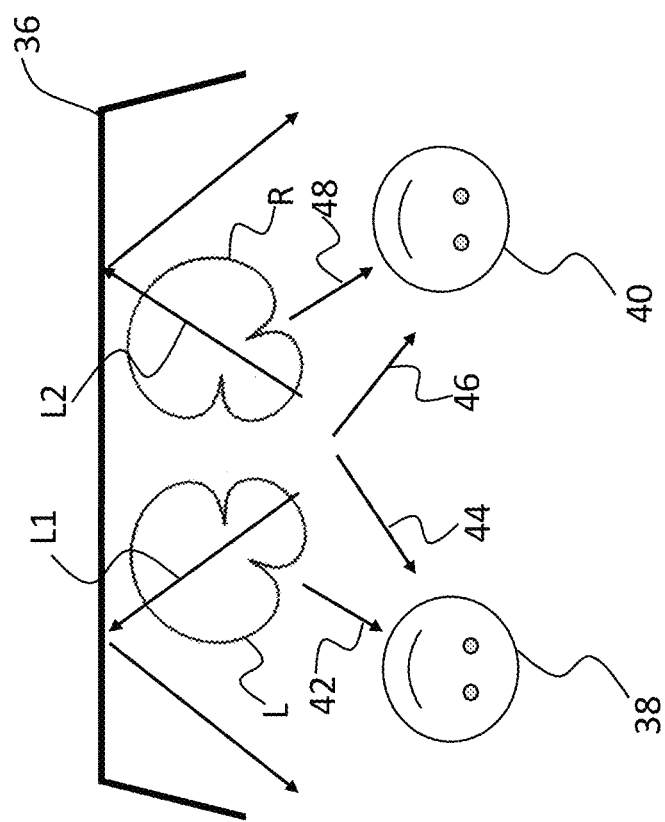
FIG. 6 shows reflections and directional radiation patterns produced by exemplary disclosed audio system embodiments.

FIG. 6 provides a conceptual representation of sound produced by the disclosed directional systems and delivered to occupants of a vehicle. FIG. 6 does not show the actual speaker array, but instead shows a typical cardioid directional radiation pattern of two speaker pairs disposed at an angle relative to one another (e.g., along lines L1 and L2, as shown in FIG. 1 or along lines L3 and L4, as shown in FIG. 3). In one example, if a speaker array is mounted on the instrument panel of a vehicle with the front speakers 1, 2 or 31, 34 forward of rear speaker 3 or rear speakers 32,33, then a directional pattern will be generated in the forward direction (e.g., towards the vehicle's windscreen 36, as shown in FIG. 6). The respective left and right channels of a stereo audio signal may then be reflected in different directions from the windscreen 36 and toward occupant locations (e.g., driver or passenger seats, etc.), such that occupants 38, 40 may perceive the left and right channels as emanating from one or more reflected surfaces within the vehicle.

Small amounts of sound energy (as shown by arrows 44 and 46) may be projected from the speaker pairs to the occupants (e.g., without reflection). This energy may be associated with the rearward components generated by the pairs of speakers in the speaker array. The directional sound patterns have nulls, represented by lines 42 and 48, which correspond to regions and associated directions from which minimal energy is projected to the vehicle occupants from the pairs of speakers in the speaker array.

Considering the right hand occupant 40 of FIG. 6, direct sound energy 48 from the right pair of speakers (e.g., from speakers 2 and 3 or from speakers 33 and 34) is low due to the fact that a null 48 is pointed directly at the occupant 40. Thus, the occupant 40 predominantly receives the energy from the right pair reflected off the windscreen 36 (initially in line L2) and therefore the perceived sound is shifted to the right and rearward relative to the right speaker pair.

Right occupant 40 also receives a lower level of sound energy directly from the left speaker pair (e.g., rearward component 303 represented in FIG. 6 by line 46). Occupant 40, however, receives stronger sound energy from the reflection from the windscreen of the forward component of the left speaker array (e.g., forward component 302 initially along line L1/L3 from speakers 1 and 3 or from speakers 31 and 32). As a result, the occupant 40 may perceive sound emanating from the left speaker pair as shifted more leftward and rearward relative to the left speaker pair. Similar analysis applies to the position of occupant 38.

As noted, windscreen 36 may serve as a sound reflective surface within a vehicle. Additional sound reflective surfaces may include a headliner, a side window, a door, a rear window, a parcel shelf, seat backs, etc.

Figure 8:
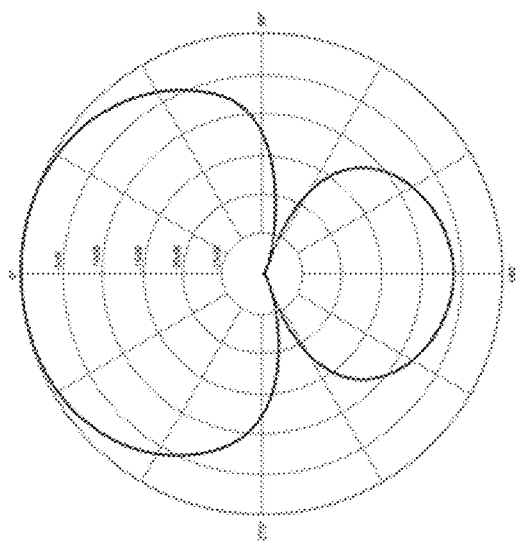
FIG. 8 shows a supercardioid pattern.
Figure 7:
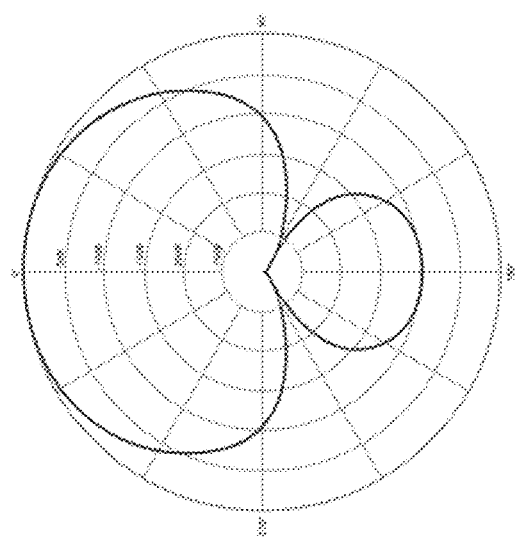
FIG. 7 shows a hypercardioid pattern.

By adjusting the processing used to generate the accommodating signals supplied to rear speakers of loudspeaker pairs, the shape of a resulting directional sound pattern may be varied. FIGS. 7 and 8 provide examples of directional sound patterns that may be generated by the speaker arrays of the disclosed audio systems. FIG. 7 shows a hypercardioid pattern, and FIG. 8 shows a supercardioid pattern. The hypercardioid pattern of FIG. 7 may be more directional than cardioid or supercardioid patterns and may exhibit larger rear lobes and null points at 110° and 250°. The supercardioid pattern of FIG. 8 may be more directional than a cardioid and exhibits null points typically at 127° and 233°.

Various parameters of the audio system may be adjusted to generate different directional sound patterns, to vary locations of null points, etc. Controlling such parameters can be used to customize the sound field produced by the disclosed audio systems to better match the characteristics of certain vehicle interiors.

In some cases, the delay applied to accommodating signals can be varied to affect the shape of a generated directional sound pattern. Additionally or alternatively, the spacing between speakers in a speaker pair with the speaker array may be varied to affect the shape of a generated directional sound pattern. In one example embodiment, the delay applied to a generated accommodating signal is 0.12 ms relative a principal signal, and a spacing of the speakers in a pair of speakers within the speaker array is 9 cm. In this example, the resulting directional sound pattern may fall between a supercardioid and hypercardioid shape, with a null point at about 115°.

The shape of the polar response can be changed with increased delay applied to a principal signal to generate an accommodating signal. Although beyond a point where ½ a wavelength of the generated sound corresponds to (e.g., is the same as) the separation between sources (speakers), a desired directional response (e.g., a polar response type) may be more difficult to achieve. Such a point, for example, may occur at about 1600 Hz for a 9 cm driver spacing.

In some examples, a spacing between the front and rear speakers in the first and second pairs of loudspeakers in a speaker array may be set at one quarter of a wavelength of an operational frequency of the audio system. In some cases, the operational frequency is between 500 Hz and 5.0 kHz. Further, in some examples, a spacing between the front and rear speakers in the first and second pairs of loudspeakers is between 50 mm and 200 mm.

Figure 10:
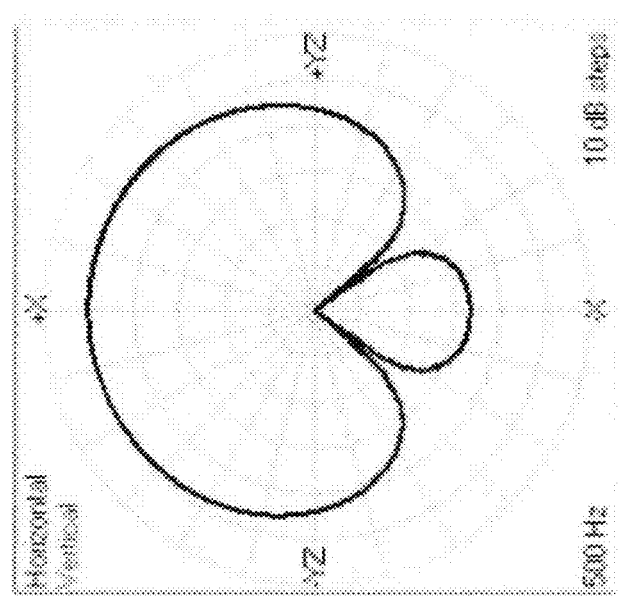
FIGS. 9 to 11 show the effects on radiation patterns caused by varying characteristics of an accommodating signal.
Figure 9:
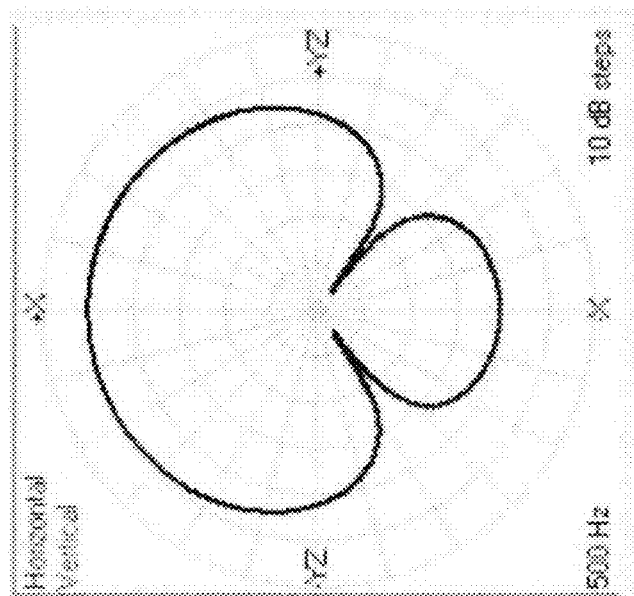
Figure 11:
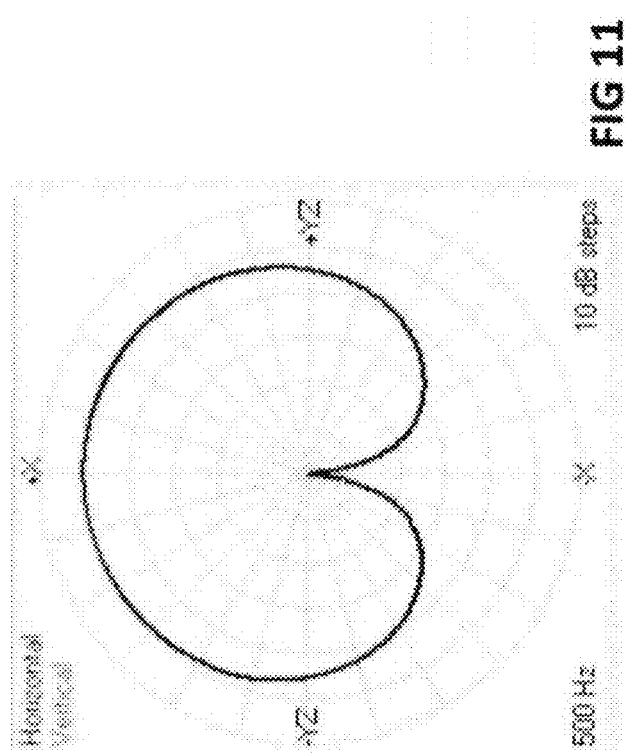

FIGS. 9-11 provide examples of different directional sound patterns resulting from varying the magnitude of delays applied to principal signals to generate corresponding accommodating signal. For example, the pattern of FIG. 9 corresponds to an accommodating signal delay of 0.1 milliseconds. The pattern of FIG. 10 corresponds to an accommodating signal delay of 0.12 milliseconds, and the pattern of FIG. 11 corresponds to an accommodating signal delay of 0.26 milliseconds. As can be seen, as the delay is increased, the rearward lobe becomes less pronounced, and the null points shift rearward. Variations in the applied delay can be used to create various different polar patterns allowing tuning of the system to different vehicle installations.

Figure 12:
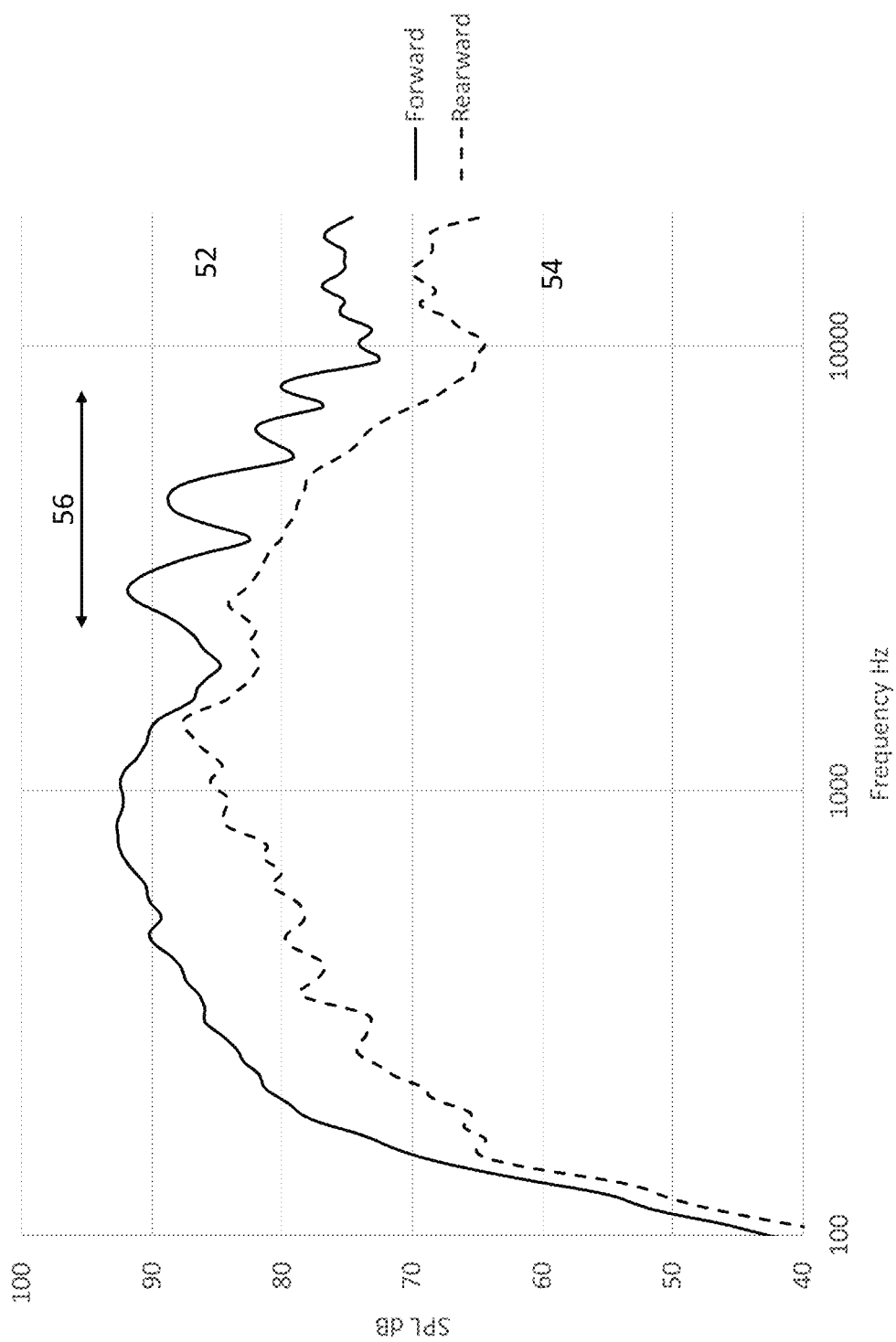
FIG. 12 shows sound pressure level versus frequency for front and rear patterns.

FIG. 12 shows a plot of Sound Pressure Level (SPL) versus frequency. Two directions (i.e., forward 52 and backward 54) are plotted. In this example, the accommodating signal was generated with a delay and a phase inversion, but without filtering. The plot shows 0 and 180 degree (forward and rearward) SPL plots for one pair of drivers mounted with their axes at 90 degrees to the baffle plane and with a microphone on the baffle plane at 1 m from the 'front' driver (e.g., speaker 1) and a second microphone 1 m to the rear. The front pattern has a comb filtering effect shown by the troughs and peaks in region 56. The plot also highlights the typical separation in practice in the region of 10 dB for a cardioid pattern, which may be less for a hypercardioid or supercardioid pattern.

Comb filtering occurs due to interference between sound from two sources (e.g., two speakers such as speakers 1 and 3). Thus, the separation between the speakers can be important. At a separation between speakers corresponding to one quarter wavelength of the operational frequency of the audio system, then constructive interference may occur. When the spacing is one full wavelength, destructive interference can occur. This leads to SPL versus frequency plots, such as the example of FIG. 12, which shows undesirable "comb" filtering occurring.

Figure 13:
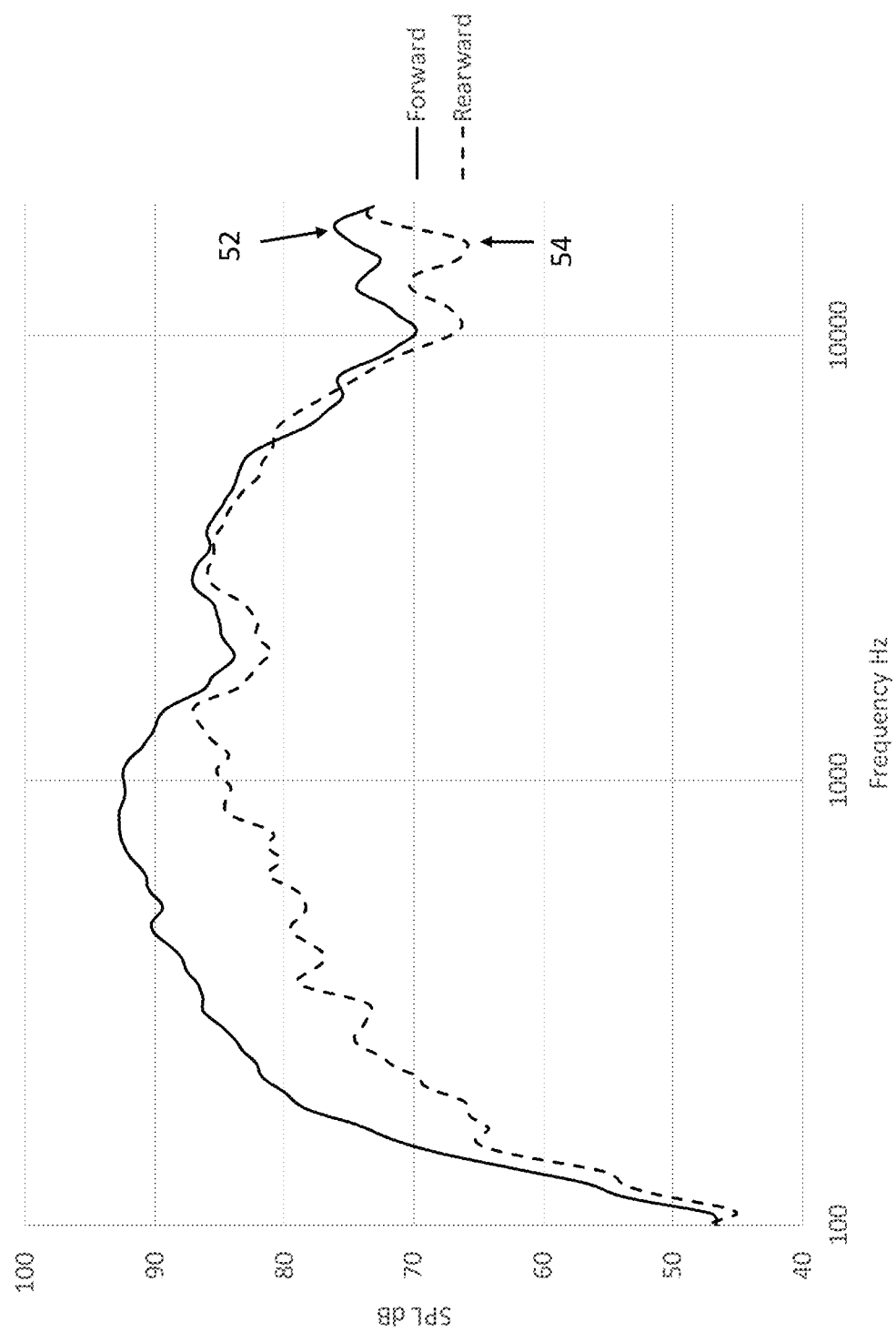
FIG. 13 shows sound pressure level versus frequency for front and rear patterns where low pass filtering has been applied to a speaker in a speaker array.

By applying low pass filtering to signal applied to a rear speaker (e.g., by filtering a principal signal to generate an accommodating signal), comb filtering can be reduced or eliminated. FIG. 13 provides an SPL versus frequency plot after such filtering has been applied. In this particular example, the low pass filtering is low pass FIR filtered at 2 KHz. This may lead to reduced rearward cancellation above 2 KHz, or a reduction in directional control above a cut-off frequency of the rear speaker, but such effects may be acceptable in view of the reduction in the comb filtering effect.

Figure 14:
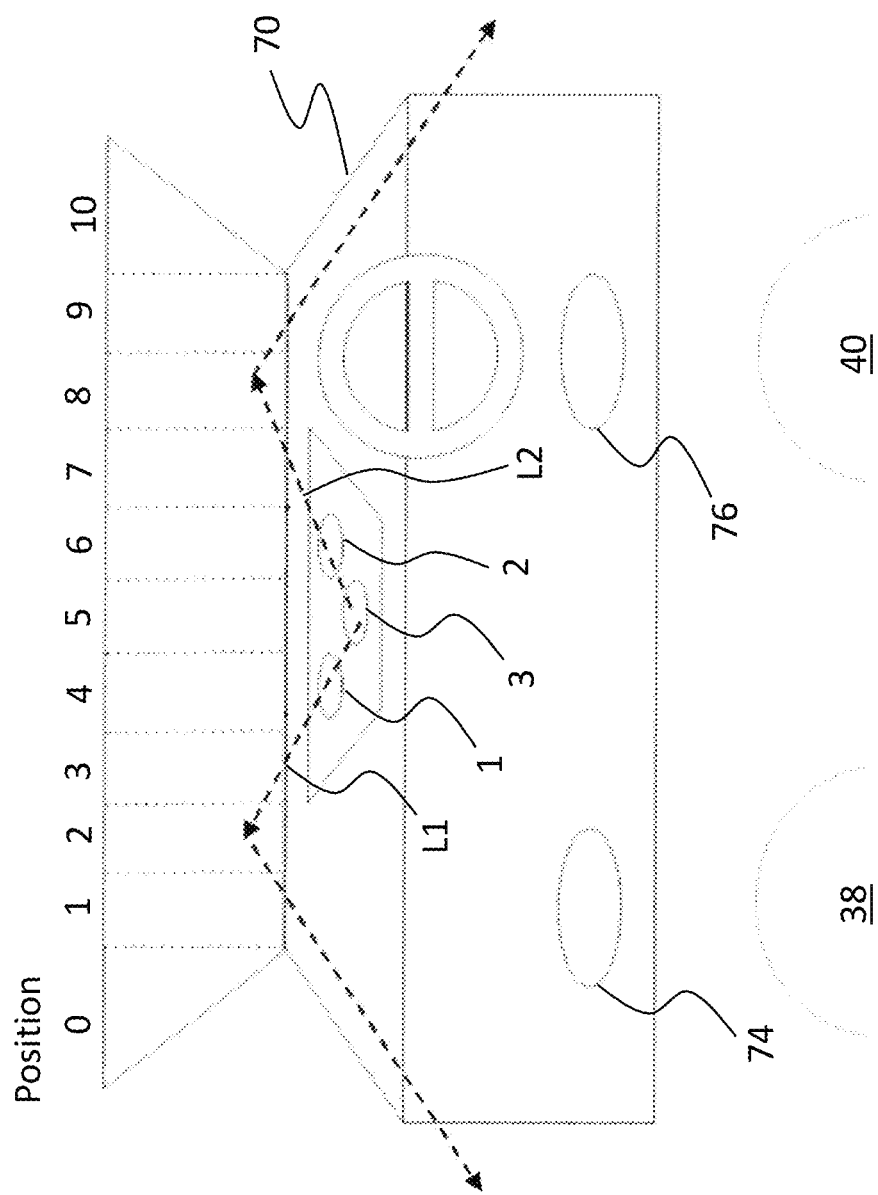
FIG. 14 provides a diagrammatic representation of an audio system mounted in an automobile.

FIG. 14 provides a diagrammatic representation of an embodiment in which a speaker array (in this case a three-speaker array, such as the array of FIGS. 1-3) is mounted on an instrument panel 70 of a vehicle. Left and right stereo signals may be generated by the speaker array and projected toward vehicle occupant/occupant locations 38 and 40. For example, a forward component of a directional radiation pattern produced by speaker pair 1 and 3 (e.g., a left channel of a stereo signal) may be projected along line L1 toward the windscreen of the vehicle. Similarly, a forward component of a directional radiation pattern produced by speaker pair 2 and 3 (e.g., a right channel of a stereo signal) may be projected along line L2 toward the windscreen of the vehicle. These components may be reflected from the windscreen (and potentially other reflective surfaces within the vehicle) and toward occupant/occupant locations 38 and 40 to provide an immersive sound experience. FIG. 14 also shows an optional pair of subwoofers 74, 76 which may be provided in a footwell area of the vehicle or in other areas of the vehicle to reproduce low frequency audio signals.

Figure 15:
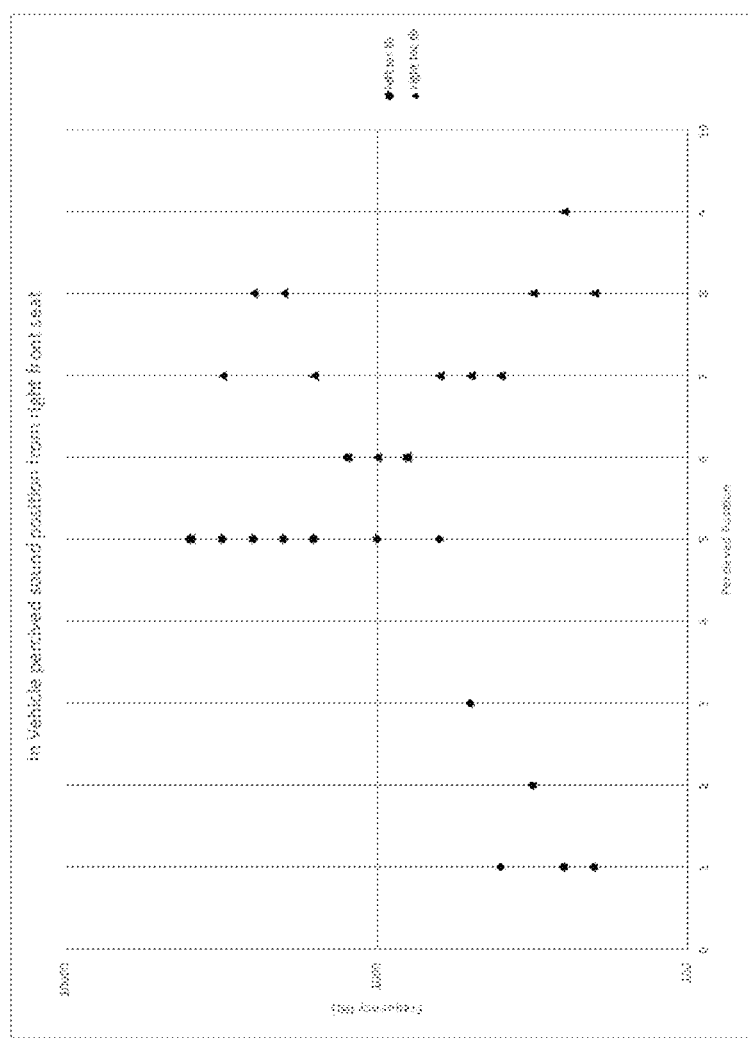
FIG. 15 represents perceived positions of sources of left and right audio signals generated by speakers of the exemplary disclosed speaker array embodiments.

FIG. 14 shows a number of horizontally spaced positional zones 0 to 10 across the windscreen. In tests, the results of which are shown in FIG. 15, users were asked to identify a particular zone from which a test sound emanated. As shown in FIG. 15, the speaker arrays according to the disclosed embodiments enable a significant level of sound separation across the zones. The circles in the plot represent left signals, and the triangles in the plot represent right signals. As shown, the embodiment of FIG. 14 exhibits significant sound directionality across a wide range of frequencies, with sounds being perceived from almost every zone across the windscreen. As described above, the forward and rearward directional sound components are dependent upon frequency, timing between principal and accommodating signals, and other factors. FIG. 15 shows effects of frequency on perceived directionality in agreement with the pattern product discussed previously. In order to controllably vary the perceived sound separation and directionality, the timing delays between principal and accommodating signals can be selected to achieve the desired results. In some cases, different delay values may be selectively applied to audio signal components according to the frequencies or frequency ranges of those components (e.g., via filtering and other signal processing techniques).

While the disclosed embodiments have been described relative to the three-speaker and four-speaker examples, any other number of speakers may also be used. For example, various numbers of speakers and speaker arrays may be positioned at various locations within a vehicle in order to improve sound quality and sound directionality. Further, specific speakers and spatial configurations of speakers within the disclosed arrays may be provided to operate within dedicated frequency bands (e.g., to take advantage of the dependence of sound directionality on frequency). Speakers/drivers may be mounted at positions including on an instrument panel, trunk, doors, parcel shelf, or at any other suitable location. There may also be more than two pairs of speakers provided with principal and accommodating signals to generate directional radiation patterns.

The invention claimed is:

1. An audio system for a vehicle, comprising:
an audio signal processing system arranged to process a plurality of audio channels and generate a principal signal and an accommodating signal for each of the plurality of audio channels;
an array of loudspeakers including at least two pairs of loudspeakers, each of the at least two pairs of loudspeakers including a front loudspeaker and a rear loudspeaker, wherein the array of loudspeakers is disposed between an occupant location in the vehicle and at least one reflecting surface of the vehicle, the array of loudspeakers and the at least one reflecting surface of the vehicle being configured to direct sound waves toward the occupant location;
wherein the loudspeakers of the array are positioned such that a first line connecting acoustic centers of a front loudspeaker and a rear loudspeaker of a first pair of loudspeakers is angularly displaced relative to a second line connecting acoustic centers of a front loudspeaker and a rear loudspeaker of a second pair of loudspeakers,
wherein the audio signal processing system is arranged to provide a principal signal of a first audio channel among the plurality of audio channels to the front loudspeaker of the first pair of loudspeakers, provide an accommodating signal of the first audio channel to the rear loudspeaker of the first pair of loudspeakers, provide a principal signal of a second audio channel among the plurality of audio channels to the front loudspeaker of the second pair of loudspeakers, and provide an accommodating signal of the second audio channel to the rear loudspeaker of the second pair of loudspeakers, to generate a directional radiation pattern from the array of loudspeakers,
wherein the directional radiation pattern includes a forward component and a rearward component associated with the first pair of loudspeakers and a forward component and a rearward component associated with the second pair of loudspeakers, and
wherein the forward component associated with the first pair of loudspeakers and the forward component associated with the second pair of loudspeakers are directed toward the at least one reflecting surface of the vehicle.

2. The audio system of claim 1, wherein the forward component associated with the first pair of loudspeakers and the forward component associated with the second pair of loudspeakers travel in different angular directions toward the at least one reflecting surface of the vehicle.

3. The audio system of claim 1, wherein the forward component associated with the first pair of loudspeakers has an intensity greater than the rearward component of the first pair of loudspeakers, and wherein the forward component associated with the second pair of loudspeakers has an intensity greater than the rearward component of the first pair of loudspeakers.

4. The audio system of claim 1, wherein the first line and the second line are non-parallel.

5. The audio system of claim 1, wherein the array of loudspeakers includes four loudspeakers.

6. The audio system of claim 1, wherein the array of loudspeakers includes three loudspeakers, and wherein one of the three loudspeakers serves both as the rear loudspeaker of the first pair of loudspeakers and as the rear loudspeaker of the second pair of loudspeakers.

7. The audio system of claim 6, wherein the loudspeaker that serves both as the rear loudspeaker of the first pair of loudspeakers and as the rear loudspeaker of the second pair of loudspeakers receives from the audio signal processing system both the accommodating signal of the first audio channel and the accommodating signal of the second audio channel.

8. The audio system of claim 1, wherein the loudspeakers of the array of loudspeakers are positioned in the audio system such that upon installation in the vehicle, the loudspeakers will be in an upfiring orientation.

9. The audio system of claim 1, wherein the loudspeakers of the array of loudspeakers are positioned in the audio system such that the acoustic centers of the loudspeakers are substantially co-planar.

10. The audio system of claim 1, wherein the loudspeakers of the array of loudspeakers are positioned in the audio system such that longitudinal axes of the loudspeakers extending through the acoustic centers of the loudspeakers are substantially parallel.

11. The audio system of claim 1, wherein the loudspeakers of the array of loudspeakers are positioned in the audio system such that upon installation in the vehicle, the front loudspeaker of the first pair of loudspeakers and the front loudspeaker of the second pair of loudspeakers are positioned closer to the at least one reflecting surface of the vehicle than the rear loudspeaker of the first pair of loudspeakers or the rear loudspeaker of the second pair of loudspeakers.

12. The audio system of claim 1, wherein the at least one reflective surface includes at least one of a windscreen, a headliner, a side window, a door, a rear window, a parcel shelf of an automobile.

13. The audio system of claim 1, wherein the accommodating signal of the first audio channel is generated by at least one of filtering, inverting, or delaying the principal signal of the first audio channel, and wherein the accommodating signal of the second audio channel is generated by at least one of filtering, inverting, or delaying the principal signal of the second audio channel.

14. The audio system of claim 1, wherein the accommodating signal of the first audio channel is generated by applying a delay to the principal signal of the first audio channel, and wherein the accommodating signal of the second audio channel is generated by applying a delay to the principal signal of the second audio channel.

15. The audio system of claim 14, wherein the delay applied to the principal signal of the first audio channel and the delay applied to the principal signal of the second audio channel is between 0.05 and 0.5 milliseconds.

16. The audio system of claim 1, wherein a spacing between the front and rear speakers in the first and second pairs of loudspeakers is one quarter of a wavelength of an operational frequency of the audio system.

17. The audio system of claim 16, wherein the operational frequency is between 500 Hz and 5.0 kHz.

18. The audio system of claim 1, wherein a spacing between the front and rear speakers in the first and second pairs of loudspeakers is between 50 mm and 200 mm.

19. The audio system of claim 1, wherein each of the loudspeakers in the array of loudspeakers includes a 30 mm to 80 mm driver.

20. The audio system of claim 1, wherein an angular displacement between the first line and the second line is between 90° and 100°.

21. The audio system of claim 1, wherein an angular displacement between the first line and the second line is between 60° and 140°.

22. The audio system of claim 1, wherein the respective front loudspeakers and the respective rear speakers of the at least two pairs of loudspeakers face a common direction.

23. An automobile comprising an audio system, wherein the audio system comprises:
an audio signal processing system arranged to process a plurality of audio channels and generate a principal signal and an accommodating signal for each of the plurality of audio channels;
an array of loudspeakers including at least two pairs of loudspeakers, each of the at least two pairs of loudspeakers including a front loudspeaker and a rear loudspeaker, wherein the array of loudspeakers is disposed between an occupant location in a vehicle and at least one reflecting surface of the vehicle, the array of loudspeakers and the at least one reflecting surface of the vehicle being configured to direct sound waves toward the occupant location;
wherein the loudspeakers of the array are positioned such that a first line connecting acoustic centers of a front loudspeaker and a rear loudspeaker of a first pair of loudspeakers is angularly displaced relative to a second line connecting acoustic centers of a front loudspeaker and a rear loudspeaker of a second pair of loudspeakers,
wherein the audio signal processing system is arranged to provide a principal signal of a first audio channel among the plurality of audio channels to the front loudspeaker of the first pair of loudspeakers, provide an accommodating signal of the first audio channel to the rear loudspeaker of the first pair of loudspeakers, provide a principal signal of a second audio channel among the plurality of audio channels to the front loudspeaker of the second pair of loudspeakers, and provide an accommodating signal of the second audio channel to the rear loudspeaker of the second pair of loudspeakers, to generate a directional radiation pattern from the array of loudspeakers,
wherein the directional radiation pattern includes a forward component and a rearward component associated with the first pair of loudspeakers and a forward component and a rearward component associated with the second pair of loudspeakers, and
wherein the forward component associated with the first pair of loudspeakers and the forward component associated with the second pair of loudspeakers are directed toward the at least one reflecting surface of the vehicle.

* * * * *